United States Patent
Garg et al.

(10) Patent No.: US 7,222,170 B2
(45) Date of Patent: May 22, 2007

(54) TRACKING HITS FOR NETWORK FILES USING TRANSMITTED COUNTER INSTRUCTIONS

(75) Inventors: Pankaj K. Garg, Sunnyvale, CA (US); Thomas Gschwind, Vienna (AT); Kave Eshghi, Los Altos, CA (US); Klaus Wurster, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 10/099,827

(22) Filed: Mar. 14, 2002

(65) Prior Publication Data

US 2003/0177226 A1    Sep. 18, 2003

(51) Int. Cl.
*G06F 15/173* (2006.01)

(52) U.S. Cl. ............... 709/224; 709/200; 709/204; 709/206

(58) Field of Classification Search .......... 709/201, 709/219, 223, 224, 203, 231, 205–207; 705/14, 705/26, 34; 715/719, 526, 511; 713/201, 713/400; 719/328; 379/215; 707/1, 501, 707/513, 104; 711/133, 138; 726/10; 340/5.54
See application file for complete search history.

(56) References Cited

U.S. PATENT DOCUMENTS

| | | | | |
|---|---|---|---|---|
| 4,500,954 A | * | 2/1985 | Duke et al. ............... | 711/138 |
| 5,247,615 A | * | 9/1993 | Mori et al. ............... | 709/205 |
| 5,581,684 A | * | 12/1996 | Dudzik et al. ............. | 715/708 |
| 5,796,393 A | * | 8/1998 | MacNaughton et al. .... | 715/733 |
| 5,796,952 A | * | 8/1998 | Davis et al. ............... | 709/224 |
| 5,809,248 A | * | 9/1998 | Vidovic ..................... | 709/219 |
| 5,844,497 A | * | 12/1998 | Gray ......................... | 340/5.54 |
| 5,935,207 A | * | 8/1999 | Logue et al. .............. | 709/219 |
| 6,026,440 A | * | 2/2000 | Shrader et al. ............ | 709/224 |
| 6,081,665 A | * | 6/2000 | Nilsen et al. .............. | 717/116 |
| 6,161,113 A | * | 12/2000 | Mora et al. ................ | 715/505 |
| 6,247,064 B1 | * | 6/2001 | Alferness et al. .......... | 719/312 |
| 6,269,392 B1 | * | 7/2001 | Cotichini et al. .......... | 709/200 |
| 6,279,112 B1 | * | 8/2001 | O'Toole et al. ............ | 726/10 |
| 6,279,113 B1 | * | 8/2001 | Vaidya ....................... | 713/201 |

(Continued)

OTHER PUBLICATIONS

Behavior of WWW Proxy Servers in Low Bandwidth Conditions—Hada, Chinen, Yamaguchi, Oie www.ircache.net/Cache/Workshop99/Papers/hada-0.ps.gz.*

(Continued)

*Primary Examiner*—Thong Vu

(57) ABSTRACT

A method and system for tracking hits of a requested network file includes embedding an instruction within the file that directs the requesting device to transmit an indicator to a processor for counting subsequent to the requesting device receiving the requested file. The request for the network file is made by a requesting device (e.g., client of an end-user) and may be made over the Internet. The instruction is executed by a Web browser at the requesting device. The instruction is embedded within the Internet file, so that if the file is cached by a proxy server, the instruction is also cached. Thus, the instruction will reach the end-user regardless of whether the file is downloaded from the proxy server or from an originating server. When the file reaches the end-user, the instruction triggers the transmission of the indicator that is send to the processor for counting.

16 Claims, 3 Drawing Sheets

U.S. PATENT DOCUMENTS

| | | | |
|---|---|---|---|
| 6,304,651 B1 * | 10/2001 | Cramer et al. | 379/221.01 |
| 6,311,190 B1 * | 10/2001 | Bayer et al. | 707/104.1 |
| 6,321,310 B1 * | 11/2001 | McCarthy et al. | 711/154 |
| 6,351,467 B1 * | 2/2002 | Dillon | 370/432 |
| 6,442,594 B1 * | 8/2002 | Ouchi | 709/206 |
| 6,442,600 B1 * | 8/2002 | Anderson | 709/217 |
| 6,453,356 B1 * | 9/2002 | Sheard et al. | 709/231 |
| 6,496,878 B1 * | 12/2002 | Azevedo et al. | 710/22 |
| 6,502,099 B1 * | 12/2002 | Rampy | 707/101 |
| 6,504,838 B1 * | 1/2003 | Kwan | 370/352 |
| 6,549,944 B1 * | 4/2003 | Weinberg et al. | 709/224 |
| 6,596,030 B2 * | 7/2003 | Ball et al. | 715/511 |
| 6,647,534 B1 * | 11/2003 | Graham | 715/526 |
| 6,681,282 B1 * | 1/2004 | Golden et al. | 710/302 |
| 6,704,772 B1 * | 3/2004 | Ahmed et al. | 709/207 |
| 6,757,533 B2 * | 6/2004 | Lampela et al. | 455/415 |
| 6,766,420 B2 * | 7/2004 | Rawson, III | 711/133 |
| 6,769,016 B2 * | 7/2004 | Rothwell et al. | 709/206 |
| 6,775,695 B1 * | 8/2004 | Sarukkai | 709/219 |
| 6,819,785 B1 * | 11/2004 | Vining et al. | 382/128 |
| 6,967,946 B1 * | 11/2005 | Tackin et al. | 370/352 |
| 7,032,007 B2 * | 4/2006 | Fellenstein et al. | 709/206 |
| 2002/0046273 A1 * | 4/2002 | Lahr et al. | 709/224 |
| 2002/0120697 A1 * | 8/2002 | Generous et al. | 709/206 |
| 2002/0129051 A1 * | 9/2002 | Abdelhadi et al. | 707/501.1 |
| 2002/0129064 A1 * | 9/2002 | Guthrie | 707/513 |
| 2002/0143759 A1 * | 10/2002 | Yu | 707/5 |
| 2003/0009496 A1 * | 1/2003 | McBrearty et al. | 707/501.1 |
| 2003/0033283 A1 * | 2/2003 | Evans et al. | 707/1 |
| 2003/0055883 A1 * | 3/2003 | Wiles, Jr. | 709/203 |
| 2003/0105815 A1 * | 6/2003 | Gusler et al. | 709/204 |
| 2003/0105924 A1 * | 6/2003 | Spencer et al. | 711/115 |

OTHER PUBLICATIONS

MarketNet: Market-Based Protection of Information Systems—Yemini, Dailianas, Florissi (1998) www.cs.columbia.edu/dcc/marketnet/Publications/ice98.ps.*

Quantifying the Performance Potential of a Data Prefetch . . . —Mehrotra, Harrison (1995) ftp.csrd.uiuc.edu/pub/CSRD_Reports/reports/1458.ps.gz.*

Write Buffer Design for Cache-Coherent Shared-Memory . . . —Mounes-Toussi, Lilja (1995) ftp-mount.ee.umn.edu/pub/faculty/lilja/papers/write-buffer-iccd95.ps.Z.*

Improving File System Performance via Predictive Caching—James Griffioen (1995) casaturn.kaist.ac.kr/~sikang/course/CS530/GA95.ps.gz.*

Free Counters; free web page counters webpage hit website html access invisible basic stats trackers hit javascript . . . www.grayside.co.uk/resources/counter.htm.*

An Adaptive Network Prefetch Scheme—Zhimei Jiang And (1998) □□□□www.lk.cs.ucla.edu/PS/paper211.ps.*

Emerging Topic Tracking System—Bun, Ishizuka (2001) □□□□www.miv.t.u-tokyo.ac.jp/papers/kbkhoo_WI2001.pdf.*

Location tracking of mobiles in cellular radio networks; Hellebrandt, M.; Mathar, R.;□□□□Vehicular Technology, IEEE Transactions on vol. 48, Issue 5, Sep. 1999 pp. 1558-1562.*

Design and analysis of dynamic mobility tracking in wireless personal communication networks□□□□Chen, K.T.; Su, S.L.; Chang, R.F.; Vehicular Technology, IEEE Transactions on□□□□vol. 51, Issue 3, May 2002 pp. 486-497.*

* cited by examiner

TRACKING HITS FOR NETWORK FILES USING TRANSMITTED COUNTER INSTRUCTIONS

TECHNICAL FIELD

The invention relates generally to monitoring network files and more particularly to a method and system for tracking hits of requested network files transmitted over the Internet.

BACKGROUND ART

With the growth of the World Wide Web, an increasingly large fraction of available bandwidth on the Internet is used to transfer Web documents. Often, a Web document is formed of a number of files, such as text files, image files, audio files and video files. When an end-user at a requesting device, such as a personal computer, designates a particular Web document, a request may be made to an originating server to download the corresponding file. The total latency in downloading the requested file depends upon a number of factors, including the transmission speeds of communication links between the requesting device and the originating server in which the requested file is stored, delays that are incurred at the originating server in accessing the file, and delays incurred at any device located between the requesting device and the originating server.

One approach to reducing the total latency in downloading the requested file is the use of proxy servers. Proxy servers function as intermediaries between browsers at the end-user side of an Internet connection and the originating servers at the opposite side. An important benefit provided by the proxy server is its ability to cache frequently requested files, so that the need to continuously retrieve the same requested files is eliminated.

While caching is beneficial to the end-users, a concern is that it offsets inability of a Web site administrator of the originating server to accurately count the number of hits for the requested file, since at least some of the requests may be intercepted and serviced by the proxy server. A "hit" is an instance of accessing a network file, which may be temporary in nature, such as a "visit" to a Web site, or which may be more permanent in nature, such as a download of an executable file. There are advantages to enabling a Web site administrator to accurately count the number of hits for a particular file. For example, an accurate count may determine a popularity level of the Web site, so that the Web site administrator can determine how much to charge advertisers to present commercial banners that are displayed with each visit to the site.

U.S. Pat. No. 5,935,207 to Logue et al. describes a method for counting a number of hits made to a proxy server. According to the method, a hit is recorded for every request that is satisfied by a transfer of one or more cached files from an accessible proxy server (i.e., proxy server in which the Web site administrator has access to a hit report for the number of hits made for the requested file), if the requested file was pre-selected for tracking. There may be many of these accessible proxy servers. The total number of hits for the requested file is reported to the administrator when a request to report is made by the administrator to the accessible proxy server. While the Logue et al. method works well for its intended purpose, a concern is that the method loses its ability to accurately count the total number of hits for the requested file, since the administrator does not have access to a hit report for requests made to non-accessible proxy servers. As an example, the non-accessible proxy server may be located in a local-area network between multiple end-users and the accessible proxy server. The end-users may make multiple requests for a same requested file that is downloaded from the accessible proxy server to the non-accessible proxy server, and finally, to the end-users. While there are multiple hits for the same request, only the hit by the accessible proxy server is recorded, since the administrator does not have access to a hit report for requests satisfied by the non-accessible proxy server. Consequently, the number of hits for the requested file is inaccurate.

Another concern is that a same request made by one end-user may be counted more than once if the request is reported by more than one accessible proxy servers. As an example, an end-user may make a single request for a file that is downloaded from a first accessible proxy server to a second accessible proxy, and finally, to the end-user. During the hit reporting process, the same request may be reported twice if a hit is reported by the first accessible proxy server and another hit is reported by the second accessible proxy server.

What is needed is a method and system to accurately count the total number of hits for requested files made over a network.

SUMMARY OF THE INVENTION

A method and system for tracking hits of a requested network file include embedding or attaching an instruction within the network file that directs the requesting device to transmit an indicator subsequent to the requesting device receiving the network file. In one embodiment of the invention, there is a different file-specific indicator that is transmitted for every network file received by the requesting device of the end-user. The indicator is transmitted to a remote processor. Each indicator is counted by the remote processor for tracking a total number of hits.

The request for the network file may be transmitted over the global communications network referred to as the Internet from an end-user at the requesting device. The instruction embedded within the Internet file may be compatible with JavaScript and transparent to the end-user. The instruction to transmit the indicator can only be executed by an end-user browser. Thus, the indicator is transmitted from the requesting device only when the end-user has received the requested file. The instruction includes an address (e.g., Universal Resource Locator) of the remote processor, so that the indicator can be sent over the Internet from the requesting device of the end-user to the remote processor for counting. The indicator includes the URL of the requested file for identifying the requested file to enable tracking of the file.

The Internet file may be a text file, image file, audio file, or video file. In a conventional manner, the Internet file may be cached at an intermediate proxy server. In a case in which the request for the Internet file is received at the proxy server, a cached copy of the requested Internet file is transmitted to the end-user. The cached copy includes the instruction that directs the requesting device to transmit the indicator to the remote processor for counting. In one embodiment, the remote processor is included within the originating server. In another embodiment, the remote processor is within a component that is separate from the originating server.

In one possible application, the Internet file is a Web page stored at a Web server with other Web pages. The instruction is embedded within the Web page, so that if the Web page is cached at a proxy server, as is conventional in the art, the instruction is also cached. Thus, the instruction will reach the end-users (e.g., clients) regardless of whether the Web page is downloaded directly from the Web server or is downloaded from the proxy server. When the Web page reaches the client, the instruction triggers transmission of a count-inducing message that is the indicator. This message is sent from the client to the remote processor that is programmed to tally the hit count for the Web page. The transmission path may pass through any proxy server that functions as the intermediary or may follow a path separate from the proxy server.

An advantage of the invention is that by counting one count-inducing message for every requested Web page received by clients, a Web site administrator can more accurately track the total number of hits for the requested Web page.

DETAILED DESCRIPTION

Figure 1:
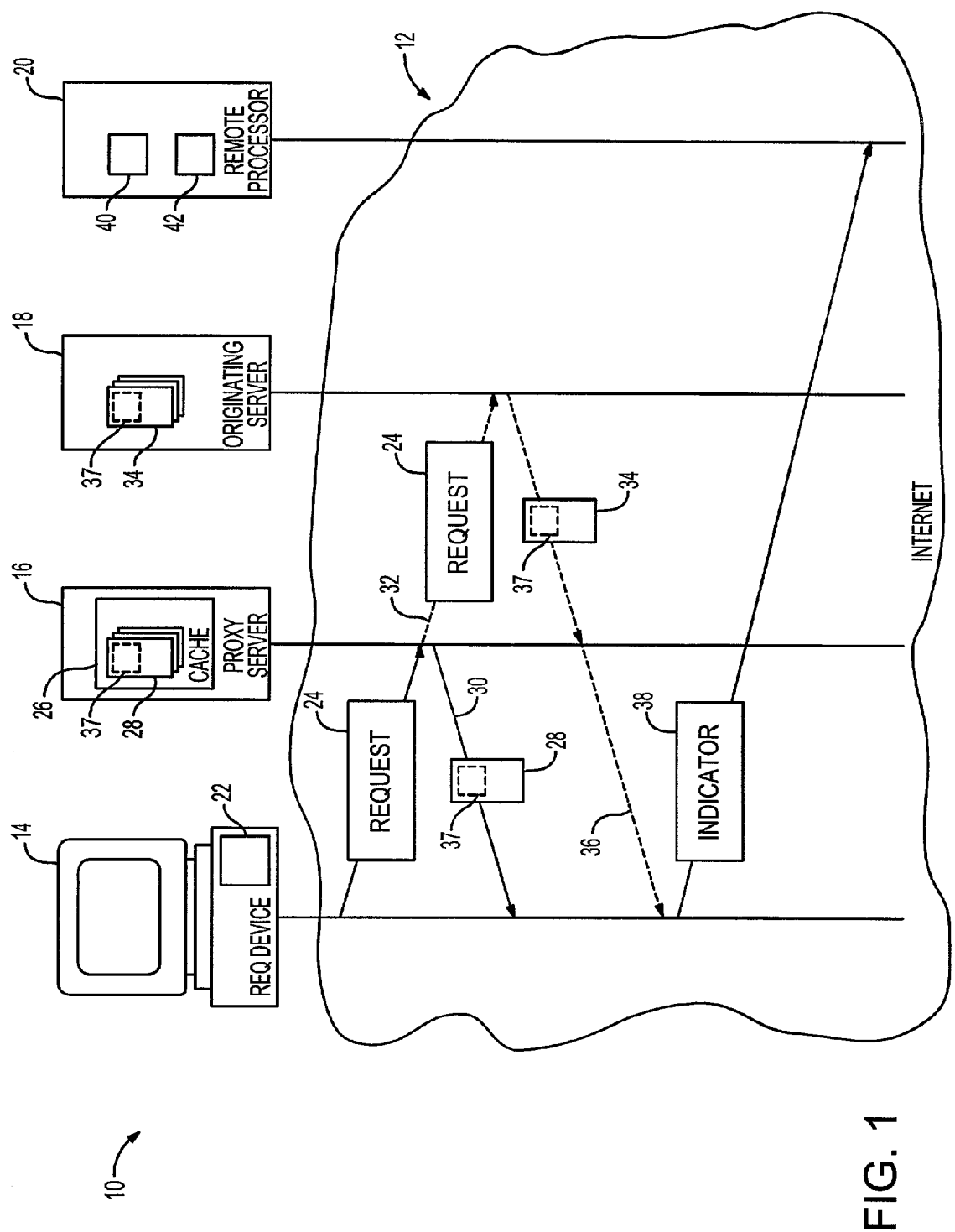
FIG. 1 is a system for tracking hits of requested network files over the Internet in accordance with one embodiment of the invention.

With reference to FIG. 1, a system 10 for tracking hits over a communications network is shown in accordance with one embodiment of the invention. While the invention will be described as being applied to the Internet 12, the system and method may be applied to other types of communications networks, such as local-area networks (LANs) or wide-area networks (WANs), without diverging from the scope of the invention.

The system 10 includes a requesting device 14, an intermediate proxy server 16, an originating server 18 and a remote processor 20. The requesting device includes a Web browser 22 to enable an end-user to interact with the Internet 12. Common examples of a Web browser include Netscape Communicators® and Internet Explorer®. When the end-user performs actions enabled by the Web browser, such as a mouse click after a cursor has been positioned in alignment with a hypertext link, the requesting device generates a request 24 for a particular Internet file. If the proxy server receives the request intended for the originating server, cache storage 26 of the proxy server 16 is searched to determine whether a cached copy 28 of the requested file is stored at the proxy server. The cache storage is used for temporary storage of Internet files, such as text files, image files, audio files and video files, that are downloaded from the originating server 18 and from many other originating servers. If the requested file is found in the cache storage, the request is serviced by the proxy server. The cached copy 28 is transmitted from the proxy server to the requesting device, via a return path as indicated by an arrow 30. The Web browser 22 at the requesting device enables the end-user to view the requested file.

On the other hand, if the requested file is not found in the cache storage 26 of the intermediate proxy server 16, the request 24 is forwarded by the proxy server to the originating server 18, via a forward path as indicated by a dashed arrow 32. While not shown, the originating server may include multiple internal databases for storing a variety of network files. Subsequent to receiving the request at the originating server, a server copy 34 of the requested file is sent from the originating server to the requesting device, via a return path as indicated by a dashed arrow 36. The requested file may be designated by a Web site administrator of the originating server as a cachable file or a non-cachable file. If the requested file is designated as a cachable file, the intermediate proxy server 16 may store a copy (i.e., cached copy 28) at the cache storage 26 in anticipation of future requests. Conversely, if the requested file is designated as a non-cachable file, the intermediate proxy server is barred from storing a copy of the requested file. It should also be noted that in some situations, the server copy is sent directly to the requesting device without passing through the intermediate proxy server.

In accordance with one embodiment of the invention, an instruction 37 is embedded or otherwise attached within the requested Internet file. The instruction is designed to direct the requesting device 14 to transmit an indicator 38 to the remote processor 20 subsequent to the requesting device receiving the requested file. The instruction may be embedded within the Internet file by the Web site administrator of the originating server 18, so that if the file is cached at the proxy server 16, the instruction is also cached. Consequently, the instruction will reach the requesting device regardless of whether the requested file is the cached copy 28 downloaded from the intermediate proxy server 16 via the return path 30 or the server copy 34 downloaded from the originating server 18 via the return path 36.

After the requested file is received at the requesting device 14, the instruction to transmit the indicator 38 is executed by the Web browser 22 at the requesting device. In one embodiment, the instruction to transmit is executable only by the Web browser at the requesting device of the end-user. This is consistent with an event-driven type of performance monitoring, since the instruction triggers transmission of the indicator to the remote processor 20 for counting subsequent to receiving the requested file by the end-user.

The indicator 38 is a count-inducing message and includes a Universal Resource Locator (URL) of the requested file. As will be described in more detail below, the URL of the requested file enables tracking of the file by the remote processor 20. In one embodiment, there is one indicator that is transmitted for every requested file received by the requesting device 14. The indicator is transmitted to the remote processor 20 for tallying the hit count of the associated requested Internet file. In this manner, an accurate count of every requested file is made. The indicator may pass through the intermediate proxy server 16 on its way to the remote processor 20 or proceed directly to the remote processor.

The instruction 37 to transmit one indicator by the Web browser 22 at the requesting device 14 of the end-user is consistent with avoiding the problem of double counting of the same requested Internet file. As an example of double counting that would occur if the instruction is not programmed or embedded in the preferred manner, a single request made by the end-user at the requesting device may be counted twice when the cache storage 26 of the intermediate proxy server 16 does not contain a cached copy 28 and: (1) a first indicator 38 is sent to the remote processor 20 by the intermediate proxy server after receiving the server copy 34 from the originating server 18, and (2) a second indicator is sent to the remote processor by the requesting device 14 after receiving the cached copy from the proxy server. Thus, by formulating and embedding the instruction to transmit one indicator to the remote processor for counting only when the requested file is received by the requesting device of the end-user, the problem of double counting is avoided.

Additionally, the instruction 37 enables tracking of the requested file in real-time, since the indicator 38 is transmitted to the remote processor 20 for counting as soon as the requested file is received by the requesting device 14. As opposed to an approach in which a tally of a subtotal count is sent to the processor for counting after a certain threshold is reached, the system of the present invention enables tracking of every request received by the requesting device in close to real-time.

The instruction 37 to transmit the indicator 38 by the requesting device 14 of the end-user subsequent to the requesting device receiving the requested Internet file is included as part of a monitoring tool for monitoring client transactions performed over a communications network, such as the Internet 12. While other machine-executable instructions and languages, such as C++ functions, can be used, one example of a JavaScript sequence is as follows:

```
1   <SCRIPT language="javascript">
2   var wm_netscape=navigator.appName.indexOf("Netscape");
3
4   function wm_get_cookie(name) {
5       var start=document.cookie.indexOf(name+"=");
6       var len=start+name.length+1;
7       if (start==-1) return "0";
8       var end=document.cookie.indexOf(";", len);
9       if (end==-1) end=document.cookie.length;
10      return unescape(document.cookie.substring(len,end));
11  }
12
13  function wm_sensor_start(event) {
14      var ms=new Date( ).getTime( );
15      clickCookie=escape(ms+"-"+document.URL)+";PATH=/";
16      document.cookie="click="+clickCookie;
17      return true;
18  }
19
20  function wm_checkReferrer(clickCookie){
21      if (clickCookie=="0") return false;
22      dash=clickCookie.indexOf("-");
23      if (dash==-1) return false;
24      creferrer=clickCookie.substring(dash+1);
25      if ((creferrer!=document.referrer) && (creferrer!=document.URL))
26          return false;
27      else
28          return true;
29  }
30
31  function wm_getID(clickCookie){
32      if (clickCookie=="0") return "0";
33      dash=clickCookie.indexOf("-");
34      if (dash==-1) return "0";
35      return clickCookie.substring(0,dash);
36  }
37
38  function wm_sensor_end(event) {
39      clickCookie=wm_get_cookie("click");
40
41      if (wm_checkReferrer(clickCookie)){
42      var ms=new Date( ).getTime( );
43      document.cookie="load="+wm_getID(clickCookie)+"x"+ms+"; PATH=/";
44      myImage = new Image( ) ;
45      myImage.src = "/webmon.wmi" + "?" + document.URL;
46      }
47      return true;
48  }
49  </SCRIPT>
```

The instruction 37 of FIG. 1 to transmit the indicator 38 to the remote processor 20 is encoded in line 45 of the JavaScript example. To enable transmission of the indicator to a network destination of the remote processor so that the indicator can be counted, a "/Webmon.wmi" function is included in line 45. The "Webmon" is the remote processor 20. A URL of the remote processor can be inserted in place of "Webmon" within the instruction, so that the indicator can be navigated over the Internet from the requesting device to the processor. In a different embodiment in which the remote processor for counting is included within the originating server 18, a URL of the originating server followed by a suffix identifying the location of the processor within the originating server can be inserted in place of "Webmon" within the instruction.

Moreover, to enable tracking of a specific requested Internet file, a URL of the requested file is transmitted as part of the indicator 38 to the remote processor 20, as specified by the "document.URL" function in line 45 of the JavaScript example. In the embodiment shown in FIG. 1, the remote processor 20 tracks hits for the specific requested file by correlating the URL (that is transmitted as part of the indicator) with the URL patterns stored in a memory 40 of the remote processor 20. If a match is found, a hit is logged to a log file 42 for that specific requested file. The log file records a total number of hits for the requested file.

Figure 2:
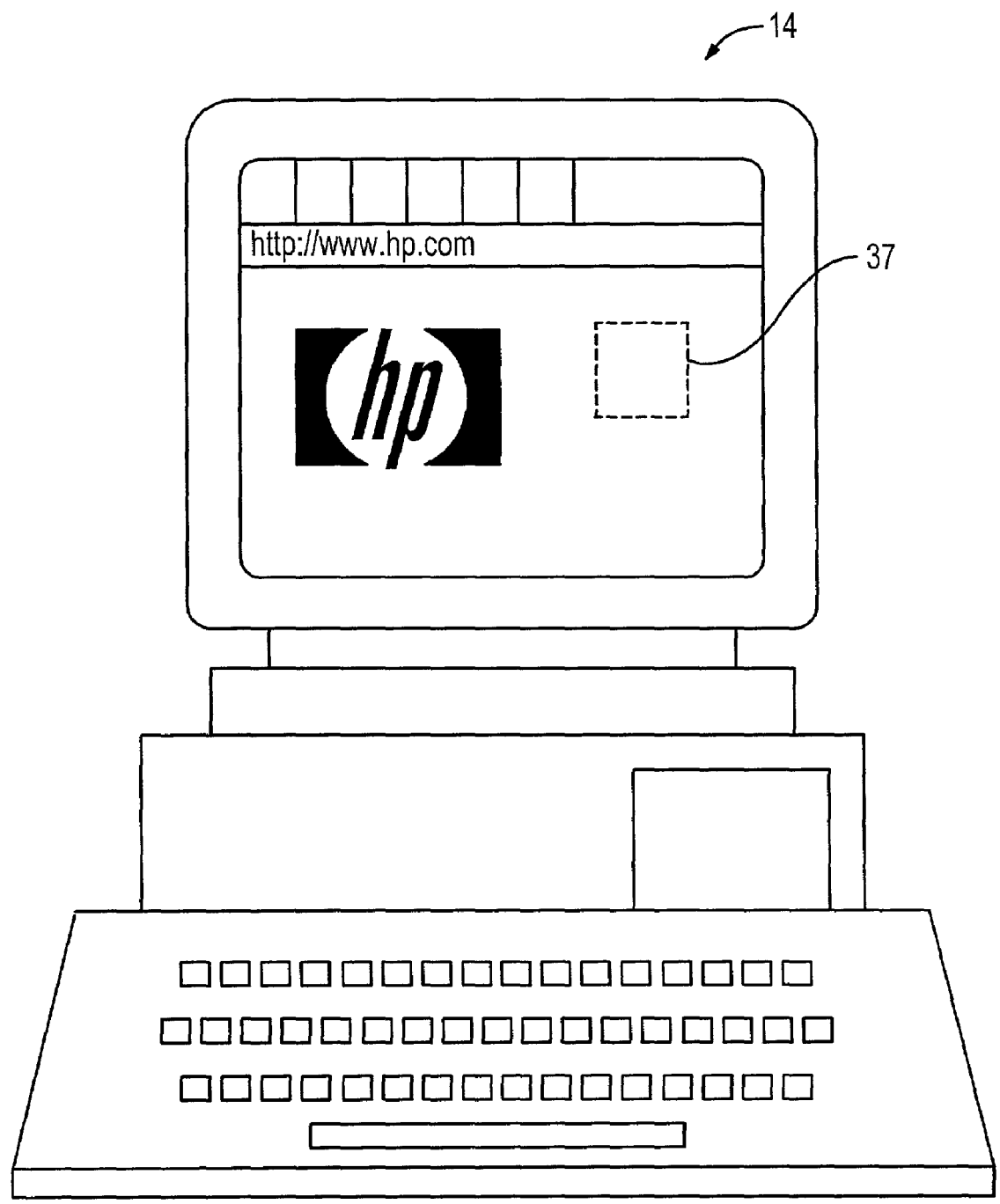
FIG. 2 is a requesting device of an end-user in accordance with the system of FIG. 1.

The instruction 37 that is embedded within the requested file is transparent to the end-user at the requesting device 14. FIG. 2 shows an exemplary Web-page displaying the Hewlett-Packard (HP) trademark within the requesting device as seen by the end-user. While the HP trademark is shown, the embedded instruction is not seen by the end-user. The instruction is represented by a dashed block to indicate that it is invisible to the end-user.

While the system 10 of FIG. 1 is described as having one requesting device 14, one intermediate proxy server 16, one originating server 18 and one remote processor 20, there is more than one requesting device and there can be more than one proxy server, originating server and remote processor for implementing the present system without diverging from the scope of the invention.

Figure 3:
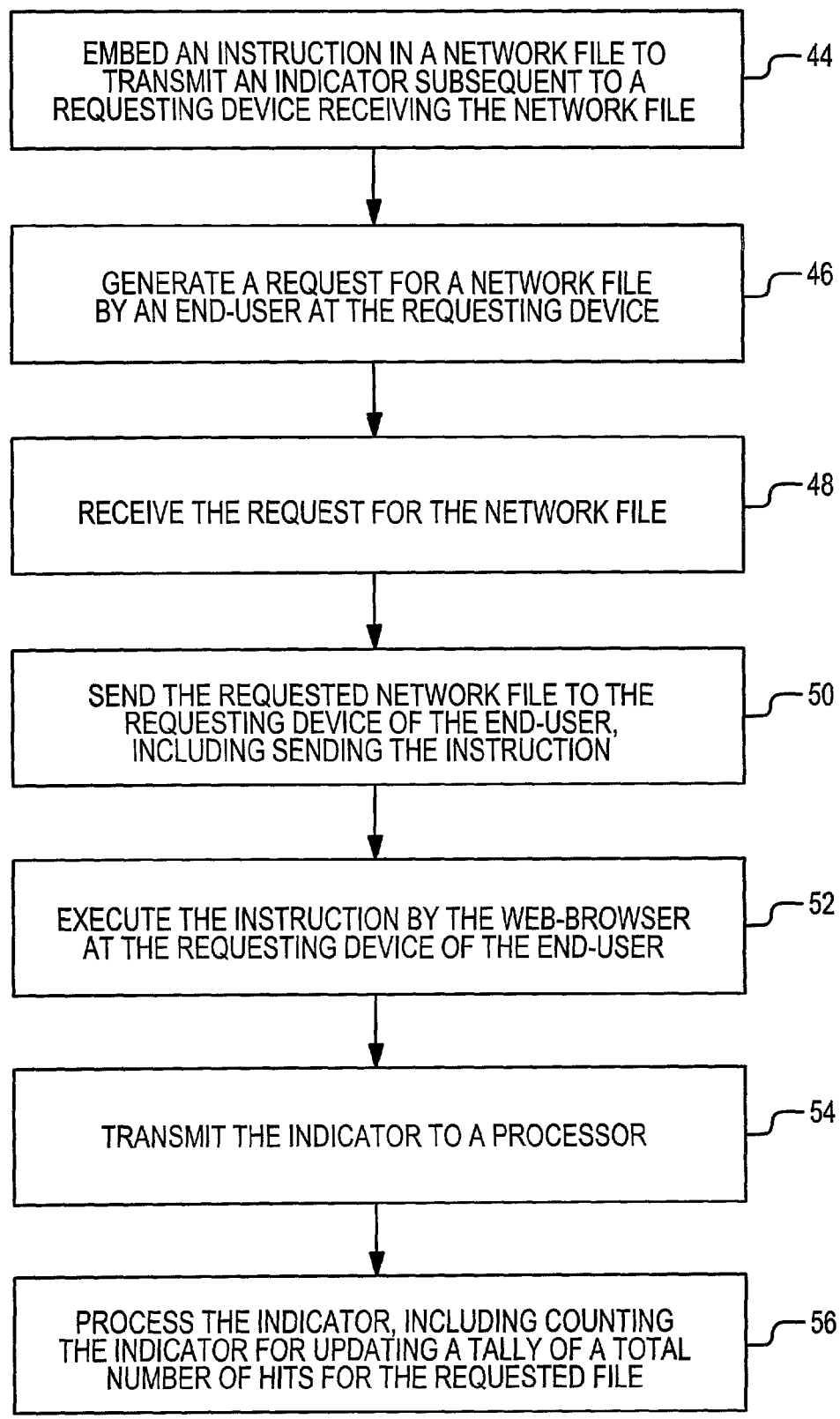
FIG. 3 is a process flow diagram for tracking hits of requested network files over the Internet in accordance with the system of FIG. 1.

The method for tracking hits of a requested Internet file is described with reference to the process flow diagram of FIG. 3 and the system of FIG. 1. In step 44, an instruction 37 is embedded in a network file for transmitting an indicator 38 subsequent to the requesting device 14 receiving the network file. In one embodiment, there is one indicator that is transmitted for every requested file received by the end-user at the requesting device. The instruction may be embedded by the Web-site administrator of the originating server 18.

In step 46, a request for the network file is generated at the requesting device 14. In one embodiment, the request is generated at the requesting device of an end-user over the Internet 12. In step 48, the request for the network file is received. The request may be received by the intermediate proxy server 16. If the cache storage 26 of the intermediate proxy server includes a cached copy 28 of the requested file, the cached copy is sent to the requesting device in step 50. However, if the cache storage does not include the cached copy, the request is forwarded to the originating server 18, where a server copy 34 is subsequently sent to the requesting device in the same step 50. Both the server copy and the cached copy include the instruction 37 to transmit the indicator subsequent to the requesting device receiving the requested file. The instruction is transparent to the end-user of the requesting device.

In step 52, the instruction 37 is executed by the end-user Web browser at the requesting device subsequent to the requesting device receiving the requested file. In step 54, the indicator 38 is transmitted to the remote processor 20 as specified in the instruction. The indicator may pass through the intermediate proxy server 16 or proceed directly to the remote processor. In step 56, the indicator is processed. The indicator is counted for updating a tally of a total number of hits for the requested file.

What is claimed is:

1. A method of tracking hits for a network file comprising the steps of:
   receiving a request for said network file from a requesting device, said receiving occurring at a proxy having cache memory to service said request when said cache memory includes a cached copy of said network file, said proxy being configured to forward said request to an originating server when said cache memory is without said cached copy;
   sending said network file to said requesting device in response to said request, said network file including an instruction to transmit an indicator subsequent to said requesting device receiving said network file, said instruction being embedded within said network file such that said instruction is transparent to an end-user at said requesting device;
   transmitting said indicator from said requesting device as an automated response to executing said instruction as a direct consequence of receiving said network file, said indicator being a count-inducing message that is specific to said network file; and
   processing said indicator at a location to which said indicator is transmitted to track said hits for said network file, including counting said indicator at said location for updating a tally of said hits for said network file, said tally thereby being representative of both sending said network file from said proxy and sending said network file from said originating server.

2. The method of claim 1 wherein receiving said request includes receiving said request over the global communications network referred to as the Internet.

3. The method of claim 1 further comprising a step of including a network address of said requested network file within said indicator, so that said indicator can be identified as corresponding to said requested network file.

4. The method of claim 1 further comprising a step of including a network address of a remote processor within said instruction for navigating said indicator from said requesting device over a network to said remote processor, so that said indicator can be processed.

5. The method of claim 1 wherein executing said instruction to transmit said indicator is executed by an end-user browser at said requesting device and is transparent to said end-user.

6. The method of claim 1 further comprising a step of generating said request for said network file at said requesting device.

7. The method of claim 1 further comprising a step of providing said instruction as programming that is compatible with JavaScript.

8. The method of claim 1 further comprising a step of providing said network file to include at least one of text information, image information, audio information and video information.

9. A method of counting a number of accesses for cachable documents comprising the steps of:
   embedding executable code in each of a plurality of said cachable documents, said executable code including an instruction triggering user-transparent transmissions of count-inducing messages from client devices, each said count-inducing message being specific to and indicative of a particular said cachable document;
   sending said cachable documents to said client devices in response to requests for said cachable documents received from any one of a plurality of said client devices, said sending being from originating servers and from Web proxies;
   receiving said count-inducing messages transmitted from said client devices as immediate and direct responses to execution of said executable code upon reception of said cachable documents; and
   counting said accesses on a basis of counting receptions of said count-inducing messages, said counting thereby updating a tally of said accesses by said plurality of client devices.

10. The method of claim 9 wherein receiving said count-inducing messages includes receiving one of said count-inducing messages for each said cachable document received by said client devices.

11. The method of claim 9 further comprising a step of storing said cachable documents in said Web proxies, said Web proxies being in communication with said client devices and at least one said originating server via the Internet, said Web proxies being configured to store said cachable documents that are downloads from said originating server.

12. The method of claim 11 further comprising a step of implementing said executable code by browser software of said client devices, such that said count-inducing messages are transmitted from said client devices.

13. The method of claim 11 further comprising a step of providing a Universal Resource Locator (URL) of a processor in said executable code to enable transmitting of said count-inducing messages from said browser software to said processor, said processor being operationally associated with said originating server.

14. A system for tracking hits over the Internet comprising:
   a proxy Web server having a store of a plurality of network files, at least some of said network files being cached copies of Internet files, each of said network files having a command to initiate a transmission of an identifier from any of a plurality of client devices as an automated response to reception of one of said network files by said-client devices;
   programming accessible via each said client device, said programming being configured to request said network files as responses to inputs from users of said client devices and to transmit said identifier in a process that is transparent to said users upon reception of one of said network files at said client device, said identifier being a count-inducing message; and
   a file access counter responsive to receiving said identifiers from client devices as a basis for counting transfers of said network files to said client devices, said file access counter being configured such that reception of each said identifier is counted and used to update a tally of said transfers of said network files to said plurality of client devices.

15. The system of claim 14 wherein said command includes programmable code embedded within each said network file, said programmable code being configured to execute said transmissions of said identifiers upon said receipt of said network files by said client devices.

16. The system of claim 15 wherein said programmable code includes an Internet address of said file access counter, said network files including World Wide Web pages.

* * * * *